Patented Aug. 11, 1936

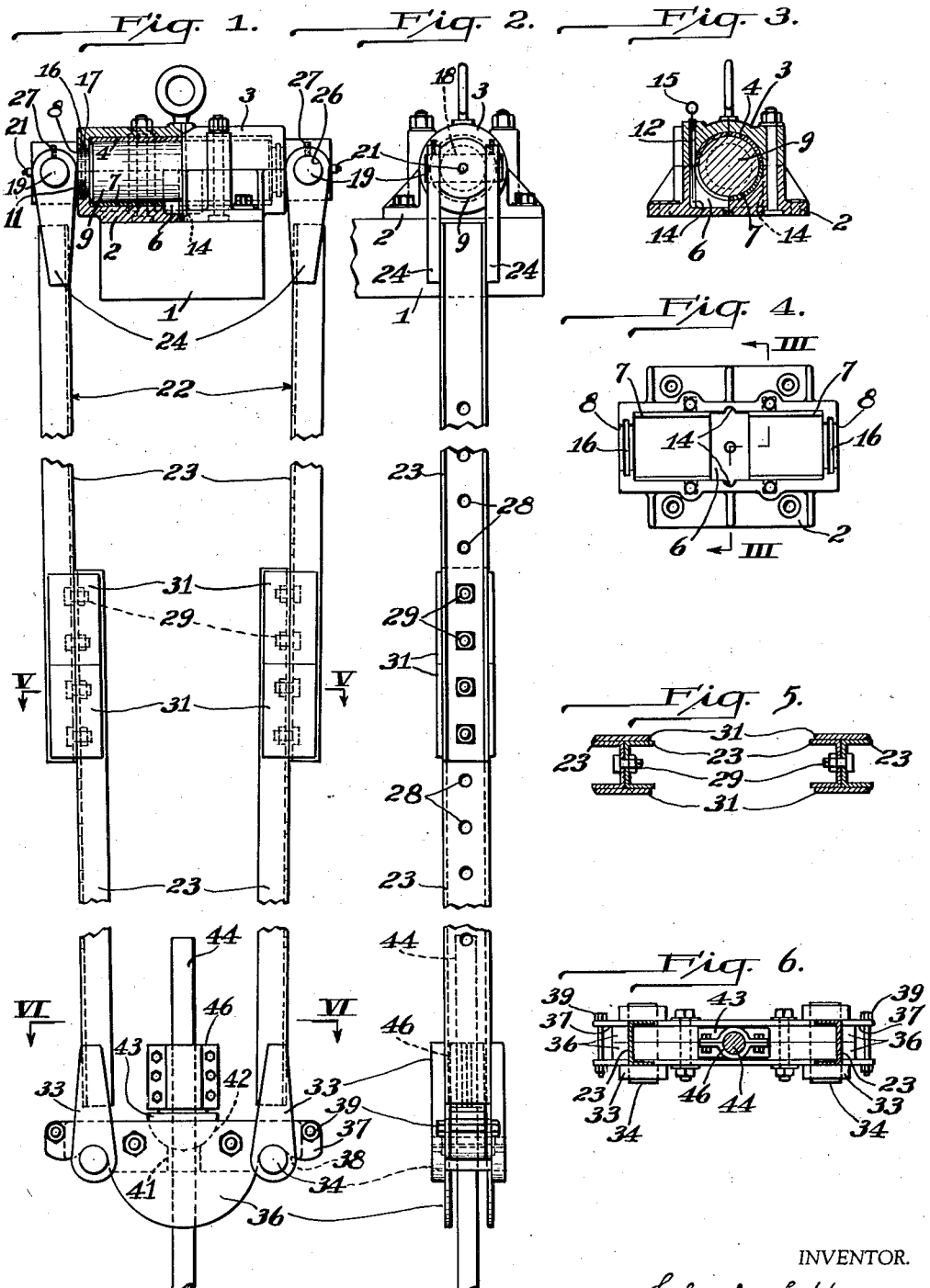

2,050,318

UNITED STATES PATENT OFFICE 2,050,318

BEAM HANGER

Charles L. Henry, Pittsburgh, Pa., assignor to Lee C. Moore & Company, Inc., Pittsburgh, Pa., a corporation of Pennsylvania Application November 11, 1935, Serial No. 49,164

15 Claims. (Cl. 255—18)

This invention relates to hangers adapted to be connected to the ends of walking-beams, and more particularly to hangers for connecting polish rods and the like to walking-beams.

It is among the objects of this invention to provide a beam hanger for polish rods which is self-aligning, which is adjustable in length, which can be quickly connected to a polish rod or disconnected therefrom, which is so designed as not to bend the polish rod, and the bearing of which is well lubricated and sealed against water and dust.

The preferred embodiment of the invention is illustrated in the accompanying drawing in which Fig. 1 is a side view of a hanger, partly in section, connected to one end of a walking-beam; Fig. 2 is an end view of the hanger; Fig. 3 is a vertical cross-section through the hanger bearing taken on a line corresponding to line III—III of Fig. 4; Fig. 4 is a plan view of the lower half of the bearing housing; and Figs. 5 and 6 are horizontal sections taken on the lines V—V and VI—VI, respectively, of Fig. 1.

Referring to the drawing, on one end of a walking-beam 1 there is mounted a bearing housing consisting of a base portion 2 bolted to the beam and a cap 3 bolted to the base portion of the housing. The interior of the housing is provided with a cylindrical chamber 4 extending transversely of the beam, the lower half of the chamber wall being provided centrally with a rectangular recess or oil reservoir 6 and the remainder of the lower wall being provided with a layer of bearing material 7 to form a semi-cylindrical bearing surface. The end walls of the housing each have a cylindrical opening 8 therethrough of smaller diameter than that of the cylindrical chamber but coaxial therewith, whereby the end openings are spaced inwardly from the bearing surface.

Journalled in the bearing of the housing for oscillation in the vertical plane of movement of the walking-beam is a cylindrical shaft 9 having restricted portions 11 extending through openings 8 and terminating in end portions projecting laterally from the sides of the beam.

To maintain good lubrication in the bearing, oil reservoir 6 is filled with oil which swishes back and forth as the bearing rises and falls with the walking-beam and spreads out on the shaft and over the bearing surface. Oil is supplied to the reservoir through a vertical oil duct 12 in the housing cap normally closed by a screw plug 13 in its upper end. If desired, this plug may be provided with a vertical opening therethrough in which a wire 15 is slidably mounted which projects in to the oil reservoir and which may be withdrawn at will to show the oil level in the bearing. Preferably, the side walls of the reservoir are provided with vertical grooves 14 into the upper end of one of which oil duct 12 opens. As there is a groove in each side of the reservoir, it is immaterial on which side of the housing the oil duct is disposed when the cap is bolted on.

Rain and dust are prevented from entering the bearing through openings 8 and contaminating the lubricant by providing the wall of each of those openings with an annular recess 16 in which packing material 17 is disposed that engages the shaft and seals the opening.

The end portions of the shaft are preferably of the same vertical diameter as the portion of the shaft within the housing, but their sides are flat and parallel and are connected by horizontal openings 18. Journalled in each of these openings with its ends projecting therefrom is a pin 19 which is lubricated by means of a lubricant fitting 21 in the end of the shaft. Suspended from these pins and adapted to be swung transversely of the walking-beam in a common plane is a pair of reins 22. Preferably each of the reins comprises a plurality of elongate members, such as channels 23, to the top portion of the flanges of the upper one of which a pair of parallel plates 24 is welded or otherwise secured. The upper ends of the plates are provided with openings 26 into which the ends of a pin 19 extend and are held in any suitable manner, such as by set screws 27.

The channels forming each rein are connected end to end with their webs in overlapping engagement. To make it possible to vary the length of the rein the channel webs are provided with longitudinally and uniformly spaced holes 28 in the registering ones of which bolts 29 are disposed for securely connecting the channels together in the desired degree of overlapping relation. Lateral movement of the channels relative to each other is prevented by a pair of plates 31 welded to the overlapping ends of the flanges of each channel and overlapping the flanges of the adjoining channel.

Depending from the bottom of each rein is a pair of plates 33 welded at their upper ends to the flanges of the rein and at their lower ends to a pin 34, whereby a stirrup is formed. Suspended from these stirrups is a carrier bar clamp the body 36 of which is provided at its upper end with outwardly projecting end portions 37 extending through the stirrups where they are supported by pins 34. To prevent the stirrups from sliding off the end portions 37, the lower surfaces of the latter are provided with transverse recesses 38 that receive pins 34. To further insure against the clamp being accidentally disconnected from the reins a bolt 39 is disposed in each end portion of the clamp beyond the adjoining stirrup, the ends of the bolt projecting across plates 33.

The body of the clamp is provided centrally with an enlarged vertical opening 41 which opens at its upper end into a semi-cylindrical recess 42 extending transversely of the walking-beam. Rockably mounted in this recess is a block 43, preferably semi-cylindrical, having a vertical opening therethrough for receiving the upper end of a polish rod 44 extending up through opening 41. The rod is prevented from pulling out of the rocker block by a polish rod clamp 46 or the like on the upper end of the rod. To facilitate connecting the carrier bar clamp to a polish rod and disconnecting it therefrom, body 36 of the bar clamp is preferably made in two halves bolted together in a central vertical plane.

This hanger is thus self-aligning both longitudinally and transversely of the walking-beam. Alignment of the hanger longitudinally of the beam results from the cylindrical shaft being journalled in the bearing housing on the beam. Alignment of the hanger transversely of the beam is permitted because the opposite ends of the reins are pivotally connected to the shaft journalled in the bearing and to the carrier bar clamp, respectively. Lateral bending strain is not placed on the polish rod when the hanger attempts to align itself therewith because the rocker block turns in clamp 36 to the necessary angle.

Lubrication of the bearing is maintained by the oil in the rservoir, and by the packing seal around the shaft which prevents dust and water from entering the bearing and contaminating the oil. The construction of the carrier bar clamp is such that it can be quickly connected to a polish rod or disconnected therefrom, while the adjustable reins permit the spacing between the bearing and rod to be altered as desired.

According to the provisions of the patent statutes, I have explained the principle and construction of my invention, and have illustrated and described what I now consider to be its best embodiment. However, I desire to have it understood that, within the scope of the appended claims, the invention may be practiced otherwise than as specifically illustrated and described.

I claim:

1. A beam hanger for polish rods, comprising a bearing adapted to be mounted on one end of a walking-beam, a reins-supporting member mounted in the bearing for oscillation in the plane of movement of the beam and having portions projecting laterally of the beam, hanger reins pivotally connected at their upper ends to said projecting portions for swinging transversely of the beam, and a polish-rod support pivotally connected to the lower ends of the reins, whereby said hanger is self-aligning transversely and longitudinally of the walking-beam.

2. A beam hanger for polish rods, comprising a bearing adapted to be mounted on one end of a walking-beam, a reins-supporting member mounted in the bearing for oscillation in the plane of movement of the beam and having portions projecting laterally of the beam, hanger reins pivotally connected at their upper ends to said projecting portions for swinging transversely of the beam, said reins being adjustable in length, and a polish-rod support pivotally connected to the lower ends of the reins, whereby said hanger is helf-aligning transversely and longitudinally of the walking-beam.

3. A beam hanger, comprising a bearing adapted to be mounted on one end of a walking-beam, a reins-supporting member journalled in the bearing and having laterally projecting portions, and hanger reins suspended from said projecting portions, each rein including a plurality of overlapping elongate members and means for connecting said members together in various degrees of overlapping relation.

4. A beam hanger, comprising a bearing adapted to be mounted on one end of a walking-beam, a reins-supporting member mounted in the bearing for oscillation in the plane of movement of the beam and having laterally projecting portions, and hanger reins suspended from said projecting portions, each rein including a plurality of overlapping elongate members provided with a plurality of longitudinally spaced registering holes, and a plurality of bolts disposed in said holes for connecting said members together in various degrees of overlapping relation.

5. A beam hanger, comprising a bearing adapted to be mounted on one end of a walking-beam, a reins-supporting member mounted in the bearing for oscillation in the plane of movement of the beam and having laterally projecting portions, and hanger reins suspended from said projecting portions, each rein including a plurality of channels with the end portions of their webs engaging each other in overlapping relation, said webs being provided with a plurality of longitudinally spaced registering holes, bolts disposed in some of said holes for connecting said channels together, and a pair of plates secured to said end portions of the flanges of each channel and overlapping the flanges of the adjoining channel.

6. A beam hanger for polish rods, comprising a bearing adapted to be mounted on one end of a walking-beam, a reins-supporting member mounted in the bearing for oscillation in the plane of movement of the beam and having laterally projecting portions, hanger reins suspended from said projecting portions, a supporting member suspended from the lower ends of the reins and provided centrally with an enlarged vertical opening therethrough, and a member rockably mounted on said supporting member above said opening and provided with a vertical opening therethrough for receiving a polish rod.

7. A beam hanger for polish rods, comprising a bearing adapted to be mounted on one end of a walking-beam, a reins-supporting member mounted in the bearing for oscillation in the plane of movement of the beam and having laterally projecting portions, hanger reins suspended from said projecting portions, a supporting member suspended from the lower ends of the reins and provided centrally with an enlarged vertical opening therethrough terminating at its upper end in a semi-cylindrical recess, and a member having a semi-cylindrical lower face loosely disposed in said recess and provided with a vertical rod-receiving opening therethrough.

8. A beam hanger for polish rods, comprising a bearing adapted to be mounted on one end of a walking-beam, a reins-supporting member mounted in the bearing for oscillation in the plane of movement of the beam and having laterally projecting portions, hanger reins suspended from said projecting portions, a supporting member suspended from the lower ends of the reins and provided centrally with an enlarged vertical opening therethrough terminating at its upper end in a semi-cylindrical recess, and a semi-cylindrical member disposed in said recess and provided with a vertical rod-receiving opening therethrough, said recess-supporting member being formed of two separate halves engaging each other in a vertical plane and detachably connected together.

9. A beam hanger for polish rods, comprising a bearing adapted to be mounted on one end of a walking-beam, a reins-supporting member mounted in the bearing for oscillation in the plane of movement of the beam and having portions projecting laterally of the beam, hanger reins pivotally connected at their upper ends to said projecting portions for swinging transversely of the beam and being provided at their lower ends with stirrups, and a polish-rod support having end portions projecting loosely through and supported by said stirrups, the bottoms of said end portions having transverse stirrup-receiving recesses for preventing the stirrups from slipping off said end portions.

10. A beam hanger comprising a housing adapted to be mounted on one end of a walking-beam and being provided in its lower portion with a bearing surface, the end walls of the housing having openings therethrough spaced inwardly from said bearing surface, a cylindrical shaft journalled in the housing and having restricted end portions projecting through said openings, and hanger reins suspended from said end portions, said housing being provided with an oil duct therethrough through which oil is supplied to said bearing surface.

11. A beam hanger comprising a housing adapted to be mounted on one end of a walking-beam and being provided in its lower portion with a semi-cylindrical bearing surface, the end walls of the housing having openings therethrough spaced inwardly from said bearing surface, a cylindrical shaft journalled in the housing and having restricted end portions projecting through said openings, and hanger reins suspended from said end portions, the lower inside portion of the housing being provided with a substantially vertical oil groove, and the upper portion of the housing being provided with an oil duct therethrough opening into said groove.

12. A beam hanger comprising a housing adapted to be mounted on one end of a walking-beam and being provided in its lower portion with a semi-cylindrical bearing surface, the end walls of the housing having openings therethrough spaced from said bearing surface, a cylindrical shaft journalled in the housing and having restricted end portions projecting through said openings, and hanger reins suspended from said end portions, said bearing surface being broken by a recess forming an oil reservoir.

13. A beam hanger comprising a housing adapted to be mounted on one end of a walking-beam and being provided in its lower portion with a semi-cylindrical bearing surface, the end walls of the housing having openings therethrough spaced inwardly from said bearing surface, a cylindrical shaft journalled in the housing and having restricted end portions projecting through said openings, and hanger reins suspended from said end portions, said bearing surface being broken by a recess forming an oil reservoir with a side wall of the recess provided with a substantially vertical groove, and the upper portion of the housing having an oil duct therethrough opening into the top of said groove for supplying oil to the reservoir.

14. A beam hanger comprising a housing adapted to be mounted on one end of a walking-beam and being provided in its lower portion with a semi-cylindrical bearing surface, the end walls of the housing having openings therethrough spaced inwardly from said bearing surface, a cylindrical shaft journalled in the housing and having restricted end portions projecting through said openings, hanger reins suspended from said end portions, said housing being provided with an oil duct therethrough through which oil is supplied to said bearing surface, the end walls of the housing being provided with annular recesses in the surfaces of said openings, and packing means disposed in said recesses and engaging the restricted portions of the shaft.

15. A beam hanger for polish rods, comprising a bearing adapted to be mounted on one end of a walking-beam, a reins-supporting member mounted in the bearing for oscillation in the plane of movement of the beam and having laterally projecting portions, hanger reins suspended from said projecting portions, a supporting member suspended from the lower ends of the reins, and means adapted to engage and support a polish rod, said means being connected to said supporting member for tilting movement relative thereto whereby said means permits said rod to be disposed at an angle to the supporting member without being bent.

CHARLES L. HENRY.